United States Patent [19]
Congdon

[11] Patent Number: 6,021,983
[45] Date of Patent: Feb. 8, 2000

[54] BINOCULARS MOUNT HAVING CLAMPING AND MOUNTING PLATES

[76] Inventor: Jon M. Congdon, 3020 198th Ave. SE., Issaquah, Wash. 98029

[21] Appl. No.: 08/867,209

[22] Filed: Jun. 2, 1997

Related U.S. Application Data

[60] Provisional application No. 60/020,475, Jun. 13, 1996.

[51] Int. Cl.[7] .................................................. F16M 11/04
[52] U.S. Cl. .................................. 248/187.1; 248/309.1; 248/177.1; 224/909
[58] Field of Search ................................... 224/909, 908, 224/907, 901.4, 250, 678, 584; 150/154, 107, 108; 206/316.3; 248/187.1, 177.1, 346.03, 205.2, 505, 500, 309.1, 316.1, 316.6, 74.3, 230.8, 230.1, 230.2, 230.5, 231.31, 231.61, 226.11; 269/130, 131, 108

[56] References Cited

U.S. PATENT DOCUMENTS

| | | | |
|---|---|---|---|
| D. 344,967 | 3/1994 | Webster | 248/205.3 X |
| 1,050,364 | 1/1913 | Kobert | 248/230.8 X |
| 1,166,343 | 12/1915 | Fielding . | |
| 2,357,377 | 9/1944 | Bausch . | |
| 2,444,453 | 7/1948 | Larson | 248/178.1 X |
| 2,895,697 | 7/1959 | Pagliuso . | |
| 2,990,089 | 6/1961 | Nystrom | 224/909 X |
| 3,055,283 | 9/1962 | Suzuki . | |
| 3,133,719 | 5/1964 | Beck . | |
| 3,173,638 | 3/1965 | Neale, Sr. | 248/74.3 X |
| 3,526,056 | 9/1970 | Stropkay | 248/230.8 X |
| 3,526,347 | 9/1970 | Kuban . | |
| 3,545,659 | 12/1970 | Libby | 150/108 X |
| 3,661,308 | 5/1972 | Walters . | |
| 4,378,100 | 3/1983 | Minozzi et al. . | |
| 4,545,414 | 10/1985 | Baum | 150/107 X |
| 4,556,159 | 12/1985 | Swain | 224/909 X |
| 4,557,451 | 12/1985 | Conway | 248/187.1 |
| 4,637,536 | 1/1987 | Wong . | |
| 4,865,191 | 9/1989 | Easter | 224/909 X |
| 5,221,991 | 6/1993 | Webster | 248/187.1 |
| 5,332,136 | 7/1994 | Rudolph . | |
| 5,362,025 | 11/1994 | Trom et al. . | |
| 5,598,995 | 2/1997 | Meuth et al. | 248/74.3 |

Primary Examiner—Ramon O. Ramirez
Assistant Examiner—Stephen S. Wentsler
Attorney, Agent, or Firm—Lyon & Lyon LLP

[57] ABSTRACT

A binoculars mount secures a pair of binoculars to a mounting plate, which can, in turn, be mounted to a tripod or other support device. The mounting plate has a pair of cinch rings attached thereto and a plurality of openings therein. A clamping plate having a plurality of openings therein is oriented in spaced relation to the mounting plate. A single strap having hook-and-loop attachments is looped through one end of the mounting plate, through the first cinch ring, through the mounting plate openings, through the second cinch ring, through the other end of the mounting plate, through the clamping plate openings, back through the first cinch ring, over the top of the clamping plate, back through the second cinch ring and back over the top of the clamping plate to be secured by the hook-and-loop attachments.

9 Claims, 2 Drawing Sheets

BINOCULARS MOUNT HAVING CLAMPING AND MOUNTING PLATES

This application claims the benefit of provisional patent application Ser. No. 60/020,475, filed Jun. 13, 1996 and entitled UNIVERSAL BINOCULAR MOUNTING SYSTEM.

FIELD OF THE INVENTION

The invention relates to devices that secure binoculars, monoculars, night vision scopes, flashlights, and other like optical items to camera tripods, hiking staffs, window clamps, and other types of camera supports.

BACKGROUND OF THE INVENTION

Over the years binoculars of various styles and sizes have been used by great numbers of people including boaters, birders, hikers, bikers, and the like. Most of these binoculars are designed to be hand-held. However, in order to get a steady view of a distant object it is sometimes necessary to rest the binoculars on or against a solid object. Many of the larger, more powerful binoculars have built-in tripod mounting attachments; however, the smaller, compact binoculars popular for most outdoor and sports activities have no provision for mounting to available camera supports.

While there are several binocular mounting devices known in the art, these devices do not adequately address the stabilization needs of users of the current popular style of compact binoculars. Some of the described devices are complicated and/or heavy and difficult to use, while others do not work with compact binoculars, and none provide protection from the elements.

U.S. Pat. No. 3,133,719 issued to Beck describes a clamping device on a vertical column. This device does not work well with most compact binoculars because it does not adequately hold a pair of binoculars in the steady manner desired.

U.S. Pat. No. 4,557,451 issued to Conway describes a somewhat flexible, elongated mounting device with troughs for the monocular barrels of a pair of binoculars, a hump in the center against which the monocular barrels are pressed, and a securing strap that forces the flexible ends of the elongated body against the monocular barrels. Although this system is lightweight and uncomplicated, it does not work with many of the compact binoculars and does not allow for eye width adjustments in any binoculars without adjustments to the strap.

U.S. Pat. No. 5,221,991 issued to Webster describes a binocular mounting device that consists of a padded base with a holding strap which is centrally secured to the base in a manner that provides a pair of loops to secure the monocular barrels of a pair of binoculars. While this system is lightweight and uncomplicated, it will not work with compact binoculars which do not have individual monocular barrels.

U.S. Pat. No. 5,332,136 issued to Rudolph describes a complicated and heavy support apparatus for optical instruments, including binoculars, which is similar to that of Conway, but has extra positioning stops.

U.S. Pat. No. 5,362,025 discloses an apparatus for supporting personal computers atop tripods comprising a base having a fastener for securing the base to a support surface, and a plurality of support arm assemblies. This invention allows the computer to be operated atop tripods while providing a stable, transportable, and adjustable work station for using the computer in nontraditional environments.

U.S. Pat. No. 4,378,100 discloses a mount for a stand or a stool. The support legs for the stand or stool are disposed in a pyramidal relationship with a mount at the apex. The legs of the stand or stool are disposed between parallel, spaced legs of L-shaped brackets and pivotally secured thereto. The brackets are integrally joined to the legs and are removable from the remainder of the mount. The remainder of the mount comprises a support member or plate with a threaded rod depending perpendicularly therefrom. The rod passes between the L-shaped brackets, which pivotally hold the legs.

U.S. Pat. No. 3,661,308 discloses a support frame for attachment to the lower portion of the chest for supporting a viewing device such as binoculars. The support frame has an adjusting device for locating the viewing device in a convenient viewing position. The support frame includes a generally rectangular body plate, which is vertically disposed with its rearward side surface being slightly concave to the horizontal plane. The support device also includes a support arm attached to the lower front central portion of the body plate and extending horizontally forwardly from the body plate. The support frame additionally includes a vertically disposed collapsible post for supporting the viewing device at its upper end with a lower end of the post being attached to the support arm. The post is generally parallel to the body plate and is adjustable both as to its vertical height and as to its horizontal separation from the body plate. One or more straps are present for supporting the frame on the body of the wearer.

SUMMARY OF THE INVENTION

The invention is a lightweight, compact, easy-to-use binoculars mount that allows compact binoculars to be used with a tripod or other type of camera support device.

The invention includes a rigid, padded rectangular mounting plate. The bottom of the mounting plate is fitted with threaded inserts, which are multiple mounting locations for various types of tripods and other standard camera support devices. A cinch ring is attached to each end of the mounting plate. A securing strap has hook-and-loop fasteners at least on each end, and on interior portions that overlap with the two ends. The securing strap is looped around the bottom of the first of the two cinch rings, through the slots in the mounting plate and around the bottom of the second of the two cinch rings. The first end of the securing strap is attached around the first of the two cinch rings by the hook-and-loop fasteners and the second end of the securing strap is then looped around the bottom of the second cinch ring of the mounting plate. The second end of the securing strap is then looped through slots in a clamping plate, around the top of the first cinch ring, over the top of the clamping plate, around the top of the second cinch ring, and back over the top of the clamping plate. The hook-and-loop fasteners on the second end of the securing strap and on an interior portion of the securing strap complete closure of the securing strap to allow a binocular to be sandwiched between the mounting plate and the clamping plate.

The clamping plate is fitted with two resilient foam pads, which are spaced so that they apply the clamping force from the securing strap to desired locations on the binoculars to hold the binoculars firmly in place, yet allow adjustment of the width of the binocular eyepieces without loosening the strap. The pads also provide a soft, resilient contact with the binoculars and raise the securing strap out of contact with the binoculars center hinge and focus adjustment mechanism of the binoculars. The cinch rings provide mechanical leverage that allows the securing strap to apply a firm hold with less strap force. Because the cinch rings are not rigidly attached to the mounting plate, they allow the securing strap to skew fore and aft with respect to the binoculars, thus allowing full contact of the clamping pads with various shaped binoculars. The securing strap distributes the securing force equally across the width of the clamping plate.

An optional binoculars cover is sewn from a waterproof fabric with a soft lining and an elastic band sewn around the front and sides to hold the cover firmly over binoculars of various sizes. The cover is attached to mounting plate slots with two hook-and-loop straps for easy removal and adjustment of the cover. An optional waist strap, which secures the binoculars against the body of the user, consists of an elastic shock cord with a snap on one end that clips into a hole on one side of the mounting plate and an adjustable hook on the other end of the shock chord that clips into a hole on the other side of the mounting plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
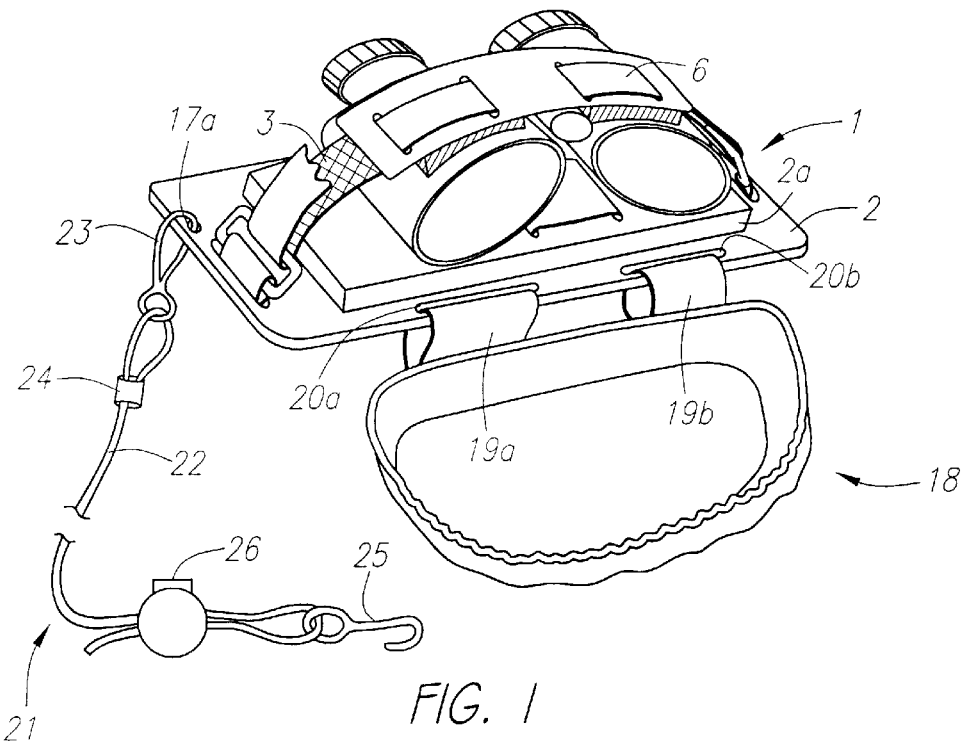
FIG. 1 is a perspective view of the invention holding binoculars and showing the mounting plate, the securing strap, the clamping plate, the protective cover, and the waist strap.

Referring to FIGS. 1 through 4, the binoculars mount 1 of the present invention includes a rigid mounting plate 2, with an attached resilient pad 2a of, for example, neoprene foam or the like, to provide a soft bed to accept the rounded underside of binoculars. Mounting plate 2 is preferably rectangular and made of plastic or metal of adequate strength to resist deformation from the weight of the binoculars and the tension of the securing of the binoculars thereto. Mounting plate 2 has cinch rings 8a and 8b attached to its ends. Mounting plate 2 also includes slots 10, 11, 12, 13 and 14 disposed in-line along a longitudinal axes of mounting plate 2.

The binoculars mount 1 of the present invention also includes clamping plate 6, a preferably flexible member having an arcuate profile to conform to the contour of the binoculars to be held. Clamping plate 6 is preferably comprised of a plastic material and has slots 6a–6d linearly disposed across the width thereof. Pads 7a and 7b are oriented in spaced apart relation on the underside of clamping plate 6 to cushion the barrels of a pair of binoculars sandwiched between clamping plate 6 and mounting plate 2.

The binoculars mount 1 of the present invention preferably includes a single securing strap 3, having segments 4 and 5. Securing strap segments 4 and 5 include a hook material and a loop material (for example, OMNITAPE® by VELCRO®) on opposing faces of at least segments 4 and 5 and preferably along the entire length of opposite faces of securing strap 3, which allow the securing strap 3 to be folded back on itself, securing the hooks into the loops and creating a holding force. OMNITAPE® is a hook and loop fastener with both hooks and loops on each of two faces. However, more traditional hook-and-loop fasteners with hooks on one face and loops on the other can also be employed. Segments 4 and 5 are sized such that binoculars of differing exterior dimensions can be held by the hook-and-loop attachment of segments 4 and 5 to mounting plate 2 and clamping plate 6 when securing strap 3 is adjusted based on binocular size.

Figures 2, 3:
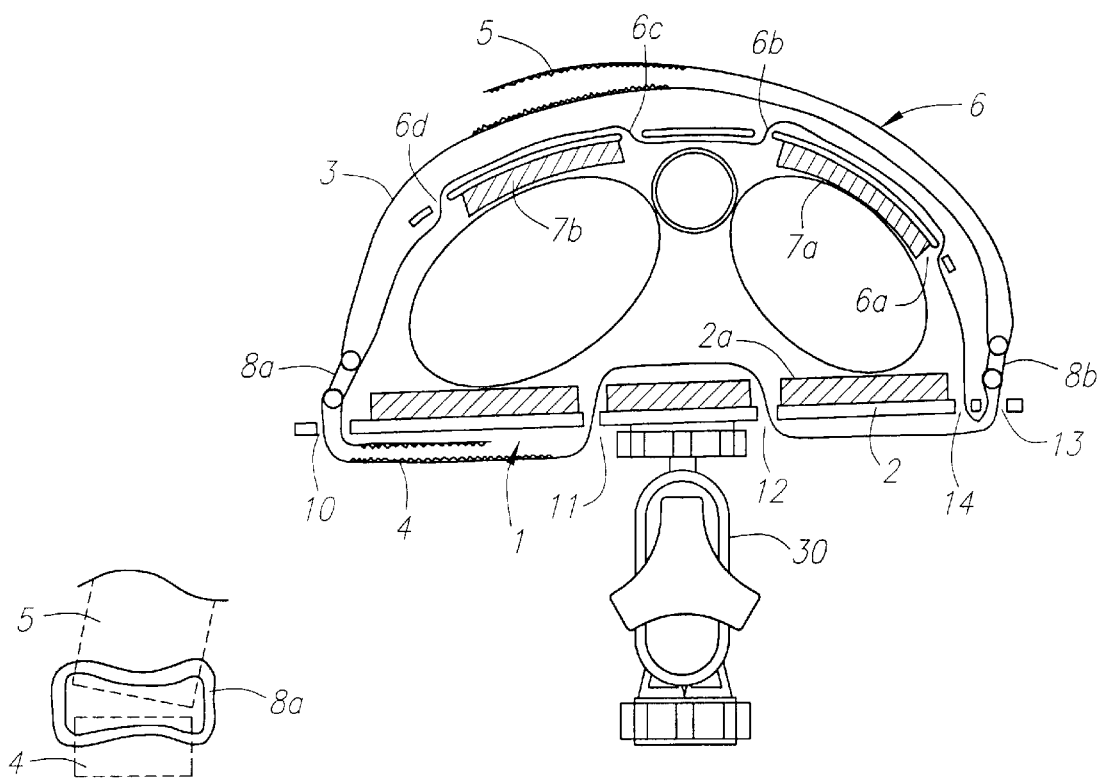
FIG. 2 is a front view of the invention holding binoculars and with an optional bracket attached thereto.
FIG. 3 is a detail view showing the securing strap routing through a mounting plate cinch ring.
Figure 4:
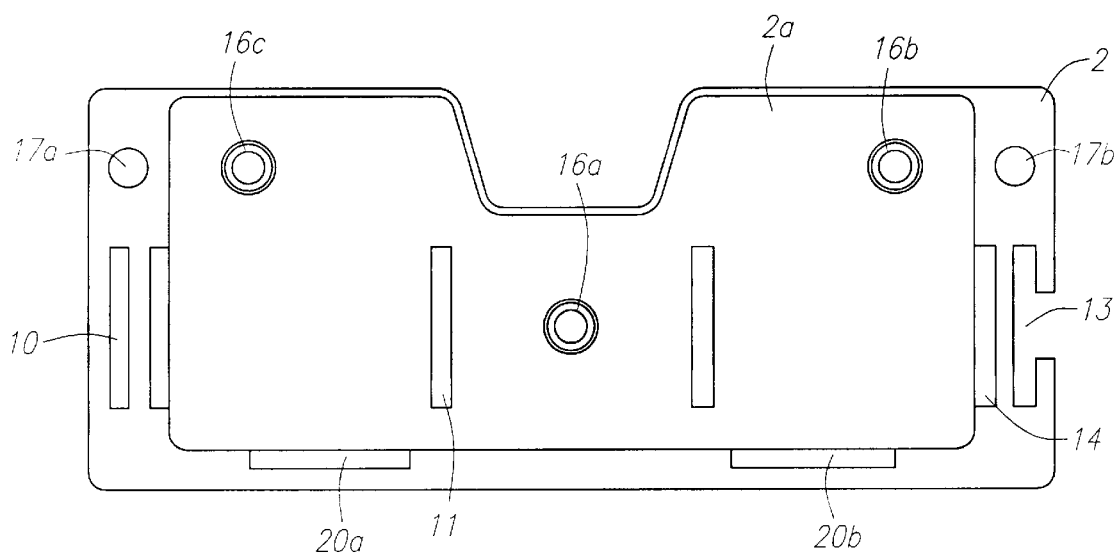
FIG. 4 is a top view of the mounting plate having a foam pad, and openings for attaching the securing strap, cover, and waist strap.

Referring to FIGS. 2 and 3, strap segment 4 is threaded through slot 10 of mounting plate 2, is looped through the bottom of cinch ring 8a, back through slot 10, and is doubled back upon itself to lock the hooks and the loops on opposing faces of segment 4. The securing strap 3 continues through slots 11 and 12 to be secured to mounting plate 2 while leaving the underside of mounting plate 2 and tripod attachment 16a, 16b and 16c exposed attachment of tripod bracket 30 thereto. Securing strap 3 continues through key slot 13 to the upper side of mounting plate 2, through the bottom of cinch ring 8b, back down through key slot 13 and then up through slot 14. At this point, the attachment of securing strap 3 to mounting plate 2 is completed. To attach securing strap 3 to clamping plate 6, strap segment 5 is looped sinusoidally through slots 6a, b, c, d in clamping plate 6, down through the upper portion of cinch ring 8a, back up over the top of clamping plate 6, through the upper portion of cinch ring 8b, and is doubled back upon itself to secure the hooks and the loops on opposing faces of segment 5. Cinch rings 8a and 8b allow the non-hook-and-loop side of segments 4 and 5 of securing strap 3 to slide freely as the securing strap 3 is being cinched.

Cinch rings 8a and 8b also reverse the orientation of the two faces of securing strap 3 so that the face of segment 4 and of segment 5 having hooks thereon abuts the face of segment 4 or segment 5 having loops thereon if the hook-and-loop fasteners are not present along the entire length of the two opposite faces of strap 3.

Cinch rings 8a and 8b are preferably of a "bow-tie" shape, as shown in FIG. 3, that facilitates securing strap 5 to easily skew fore and aft to accommodate binoculars of various shapes without compromising the strap tension. Rectangular or round rings generally used in this type of application do not function adequately as they cause a strap to bind or bunch when skewed, thus making it difficult to cinch the strap correctly.

Clamping plate 6 is of a flexible material which conforms to the contour of the binoculars, pressing pads 7a and 7b against the binoculars barrels as securing strap 5 is drawn up tight. Prior to tightening securing strap 5, clamping plate 6 may be moved longitudinally along securing strap 5 to position pads 7a and 7b directly over the barrels of the binoculars to apply properly directed clamping force and to provide clearance under clamping plate 6 for the centrally located focus mechanism on some binoculars.

It is common for hikers, birders, and others to wear binoculars around their necks for extended periods, and in these cases it is desirable to protect the binoculars from the elements and to secure the binoculars against the body. As shown in FIG. 1, a padded nylon cover 18 is removably attached by adjustable hook-and-loop strap hinges 19a and 19b to the mounting plate 2 through slots 20a and 20b. The cover 18 is contoured to approximate the shape of a pair of binoculars and has a ring of elastic material sewn around its open end which, when pulled over the binoculars, constricts to hold the cover 18 over the binoculars. The cover 18 may be made of canvas, nylon, neoprene, knitted stock, or the like and may include a waterproof coating. Cover 18 may be embossed, printed, or embroidered with a logo, user's name, decoration, or instructional material and the like.

To secure the binoculars mount 1 and binoculars against the user's body, an adjustable elastic waist strap 21 is provided. As shown in FIG. 1, the waist strap 21 consists of an elastic shock cord 22 secured to a snap 23, with crimp 24 at one end, and a hook 25 with an adjustment lock 26 on the other end. Snap 23 clips into hole 17*a* on mounting plate 2 removably attach waist strap 21 to mounting plate 2. Cord 22 is placed around the user's waist, and hook 25 is placed into hole 17*b* to secure cord 22 to mounting plate 2. Lock 26 can be released to allow cord 22 to be lengthened or shortened as required.

While the above embodiments show the mounting of binoculars, the present invention contemplates the mounting of other optical devices which should be stabilized to maximize optical performance such as, for example, monoculars, night vision scopes, telescopes, still cameras, video cameras, and lights. The supports to which the above devices can be mounted include tripods, hiking staffs, and clamping devices.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for mounting an optical device to a support structure comprising:
   a mounting plate securable to a support structure, said mounting plate having openings therein;
   a clamping plate in spaced relation from the mounting plate for retention of the optical device therebetween, the clamping plate having openings therein;
   first and second cinch rings attached in spaced relation to at least one of the mounting plate and the clamping plate; and
   a securing strap looped through each of the cinch rings, through each of the openings of the mounting plate and through each of the openings of the clamping plate to secure an optical device between the mounting plate and the clamping plate wherein each of the first and second cinch ring has an upper portion and a lower portion, the securing strap being looped through the lower portion of the first cinch ring, through the openings of the mounting plate, through the lower portion of the second cinch ring through the openings of the clamping plate, through the upper portion of the first cinch ring, over the clamping plate, through the upper portion of the second cinch ring and over the clamping plate.

2. The apparatus of claim 1, wherein said securing strap has a first end and a second end, said securing strap having fastening means adjacent said first end and fastening means adjacent said second end.

3. The apparatus of claim 2, wherein the fastening means is hook-and-loop fasteners.

4. The apparatus of claim 1, wherein said clamping plate has an arcuate profile.

5. The apparatus of claim 1, where the clamping plate includes a pair of pads in spaced relation on the side of the clamping plate facing the mounting plate.

6. The apparatus of claim 1, wherein said clamping plate is flexible.

7. The apparatus of claim 1, wherein the mounting plate has a pad on the side of the mounting plate facing the clamping plate.

8. The apparatus of claim 1, further comprising an optical device cover removably attached to said mounting plate.

9. The apparatus of claim 1, further comprising a strap removably attached to the mounting plate for supporting the apparatus on a user of said optical device.

* * * * *